United States Patent
Fear

(10) Patent No.: US 10,232,274 B2
(45) Date of Patent: Mar. 19, 2019

(54) SYSTEM AND METHOD FOR MULTI-CLIENT CONTROL OF AN AVATAR USING DIFFERENT, BUT RELATED, VIEWS

(71) Applicant: Nvidia Corporation, Santa Clara, CA (US)

(72) Inventor: Andrew Fear, Austin, TX (US)

(73) Assignee: Nvidia Corporation, Santa Clara, CA (US)

( * ) Notice: Subject to any disclaimer, the term of this patent is extended or adjusted under 35 U.S.C. 154(b) by 741 days.

(21) Appl. No.: 14/698,232

(22) Filed: Apr. 28, 2015

(65) Prior Publication Data
US 2015/0238875 A1  Aug. 27, 2015

Related U.S. Application Data

(63) Continuation-in-part of application No. 14/017,695, filed on Sep. 4, 2013.

(51) Int. Cl.
| | | |
|---|---|---|
| A63F 13/26 | (2014.01) | |
| A63F 13/30 | (2014.01) | |
| G06T 13/40 | (2011.01) | |
| A63F 13/355 | (2014.01) | |
| A63F 13/847 | (2014.01) | |
| G09G 5/00 | (2006.01) | |
| A63F 13/55 | (2014.09) | |
| H04N 7/15 | (2006.01) | |

(52) U.S. Cl.
CPC ............ *A63F 13/847* (2014.09); *A63F 13/26* (2014.09); *A63F 13/30* (2014.09); *A63F 13/355* (2014.09); *G06T 13/40* (2013.01); *G09G 5/006* (2013.01); *A63F 13/55* (2014.09); *A63F 2300/5553* (2013.01); *H04N 7/155* (2013.01)

(58) Field of Classification Search
CPC ........ A63F 13/847; A63F 13/26; A63F 13/30; A63F 13/355; G06T 13/40
See application file for complete search history.

(56) References Cited

U.S. PATENT DOCUMENTS

| | | | | |
|---|---|---|---|---|
| 2004/0201544 A1* | 10/2004 | Love | ..................... | G06F 3/1423 345/1.1 |
| 2008/0158232 A1* | 7/2008 | Shuster | ................... | G06T 13/40 345/474 |
| 2015/0067745 A1 | 3/2015 | Fear | | |

OTHER PUBLICATIONS

Iastrebov, V., Seet, G., Asokan, T., Chui, Y.P., Lau, M.W.S., "Vision Enhancement Using Stereoscopic Telepresence for Remotely Operated Underwater Robotic Vehicles", Journal of Intelligent and Robotic Systems, May 2008, vol. 52, Issue 1, pp. 139-154.*

(Continued)

*Primary Examiner* — David L Lewis
*Assistant Examiner* — Yingchuan Zhang

(57) ABSTRACT

A system for multi-client control of an avatar. In one embodiment, the system includes: (1) a game engine configured to execute game code configured to create a game in a game space and accept a response stream to allow said avatar to be controlled and (2) a cooperative play engine associated with said game engine for communication therewith and having a stereoscopic device driver configured to render left-eye and right-eye views of said game space, said cooperative play engine configured to: (2a) transmit said left-eye view toward a first client associated with a first player and (2b) transmit said right-eye view toward a second client associated with a second player.

20 Claims, 4 Drawing Sheets

(56) References Cited

OTHER PUBLICATIONS techopedia.com, "Avatar—Definition.pdf", published on Aug. 16, 2011.*

Iastrebov, V., Seet, G., Asokan, T., Chui, Y.P., Lau, M.W.S., "Vision Enhancement Using Stereoscopic Telepresence for Remotely Operated Underwater Robotic Vehicles", Journal of Intelligent and Robotic Systems, May 2008, vol. 52, Issue 1, pp. 139-154, techopedia. com, "Avatar—Definition.pdf", published on Aug. 16, 2011.*

* cited by examiner

SYSTEM AND METHOD FOR MULTI-CLIENT CONTROL OF AN AVATAR USING DIFFERENT, BUT RELATED, VIEWS

CROSS-REFERENCE TO RELATED APPLICATION

This application is a continuation-in-part of U.S. patent application Ser. No. 14/017,695, filed by Fear on Sep. 4, 2013, entitled "System and Method for Providing Real-Time Assistance Regarding a Cloud-Based Application," commonly assigned with this application and incorporated herein by reference.

TECHNICAL FIELD

This application is directed, in general, to cloud computing and, more specifically, to a system and method for multi-client control of an avatar.

BACKGROUND

The utility of personal computing was originally focused at an enterprise level, putting powerful tools on the desktops of researchers, engineers, analysts and typists. That utility has evolved from mere number-crunching and word processing to highly programmable, interactive workpieces capable of production level and real-time graphics rendering for incredibly detailed computer aided design, drafting and visualization. Personal computing has more recently evolved into a key role as a media and gaming outlet, fueled by the development of mobile computing. Personal computing is no longer resigned to the world's desktops, or even laptops. Robust networks and the miniaturization of computing power have enabled mobile devices, such as cellular phones and tablet computers, to carve large swaths out of the personal computing market. Desktop computers remain the highest performing personal computers available and are suitable for traditional businesses, individuals and gamers. However, as the utility of personal computing shifts from pure productivity to envelope media dissemination and gaming, and, more importantly, as media streaming and gaming form the leading edge of personal computing technology, a dichotomy develops between the processing demands for "everyday" computing and those for high-end gaming, or, more generally, for high-end graphics rendering in a multi-player, multi-scene environment.

The processing demands for high-end graphics rendering drive development of specialized hardware, such as graphics processing units (GPUs) and graphics processing systems (graphics cards). For many users, high-end graphics hardware would constitute a gross under-utilization of processing power. The rendering bandwidth of high-end graphics hardware is simply lost on traditional productivity applications and media streaming. Cloud graphics processing is a centralization of graphics rendering resources aimed at overcoming the developing misallocation.

In cloud architectures, similar to conventional media streaming, graphics content is stored, retrieved and rendered on a server where it is then encoded, packetized and transmitted over a network to a client associated with a user as a video stream (often including audio). The client simply decodes the video stream and displays the content. High-end graphics hardware is thereby obviated on the client end, which requires only the ability to play video. Graphics processing servers centralize high-end graphics hardware, enabling the pooling of graphics rendering resources where they can be allocated appropriately upon demand. Furthermore, cloud architectures pool storage, security and maintenance resources, which provide users easier access to more up-to-date content than can be had on traditional personal computers.

Perhaps the most compelling aspect of cloud architectures is the inherent cross-platform compatibility. The corollary to centralizing graphics processing is offloading large complex rendering tasks from client platforms. Graphics rendering is often carried out on specialized hardware executing proprietary procedures that are optimized for specific platforms running specific operating systems. Cloud architectures need only a thin-client application that can be easily portable to a variety of client platforms. This flexibility on the client side lends itself to content and service providers who can now reach the complete spectrum of personal computing consumers operating under a variety of hardware and network conditions.

SUMMARY

One aspect provides a system for multi-client control of an avatar. In one embodiment, the system includes: (1) a game engine configured to execute game code configured to create a game in a game space and accept a response stream to allow the avatar to be controlled and (2) a cooperative play engine associated with the game engine for communication therewith and having a stereoscopic device driver configured to render left-eye and right-eye views of the game space, the cooperative play engine configured to: (2a) transmit the left-eye view toward a first client associated with a first player and (2b) transmit the right-eye view toward a second client associated with a second player.

Another embodiment provides a method of controlling an avatar cooperatively. In one embodiment, the method includes: (1) executing game code configured to create a game in a game space and accept a response stream to allow the avatar to be controlled, (2) rendering a left-eye view of the game space using a stereoscopic device driver, (3) rendering a right-eye view of the game space using the stereoscopic device driver, (4) transmitting the left-eye view toward a first client associated with a first player and (5) transmitting the right-eye view toward a second client associated with a second player.

Yet another embodiment provides a cooperative play engine. In one embodiment, the cooperative play engine provides: (1) a game engine configured to execute game code configured to create a game in a game space based in part on a response stream allowing an avatar in the game to be controlled and (2) a cooperative play engine associated with the game engine for communication therewith and having a stereoscopic device driver configured to render left-eye and right-eye views of the game space, the cooperative play engine configured to: (1) transmit the left-eye view toward a first client associated with a first player, (2) transmit the right-eye view toward a second client associated with a second player, (3) receive separate response streams from the first client and the second client, (4) combine the separate response streams into a combined response stream and (5) provide the combined response stream to the game engine.

BRIEF DESCRIPTION

Reference is now made to the following descriptions taken in conjunction with the accompanying drawings, in which.

DETAILED DESCRIPTION

Figure 1:
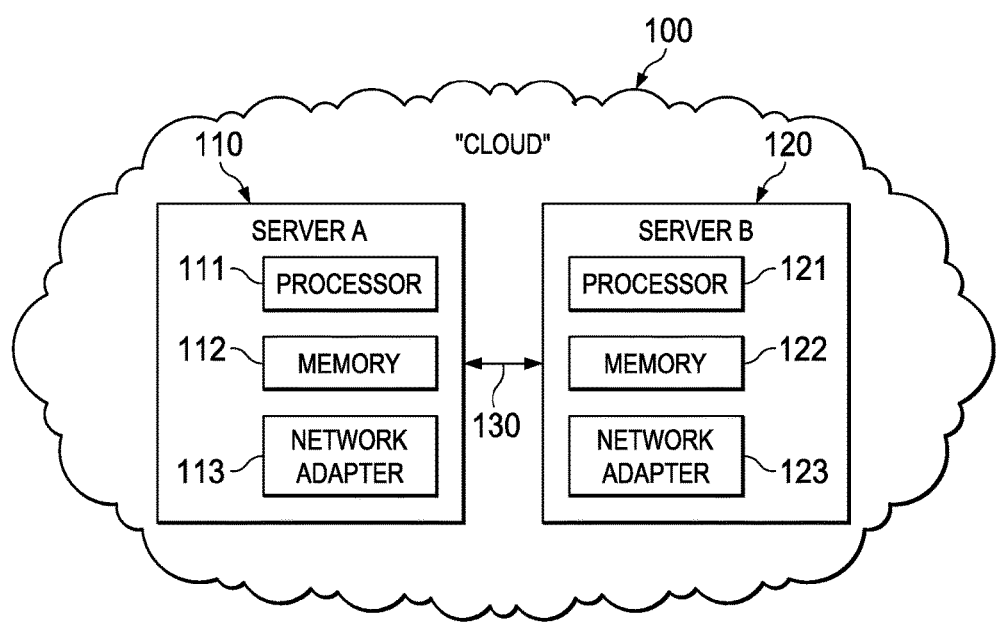
FIG. 1 is a diagram of one embodiment of a cloud of computing resources having processing and storage resources therein.

As the Background above implies, cloud-based applications are popular. Their popularity is likely to continue growing as Internet processing, storage and transport resources grow. Cloud-based games are particularly popular, because they can involve many players interacting with each other in real-time, enhancing their unpredictability and hence reality.

As those skilled in the art are aware, gaming often requires significant skill, acquired over time. In the case of single-player games, skill can be acquired at the expense of a somewhat diminished playtime or a lower score. Over time, however, the gamer acquires the desired skills, and the playtimes and scores improve.

Multi-player games are somewhat more problematic, however, as their players involved may play at widely disparate skill levels. Accordingly, a novice player may easily find himself surrounded by more experienced and capable foes. This can lead to frustratingly short playtimes and embarrassingly low scores. Ultimately, the novice player may take what in his mind is an unduly long time to acquire a desirable level of skill, perhaps discouraging him to the point of quitting. This is not a good outcome for a game manufacturer or a cloud gaming company, as commercial success is a direct function of the number of players.

It is realized herein that a gamer may benefit by being able to enlist the help of others. More specifically, it is realized herein that a player may benefit from a companion, or "sidekick," who could "sit beside him" in game space and assist him in controlling an avatar. It is further realized herein that the companion need not physically sit beside the gamer, but may be located in another room, dwelling, city, country or continent.

It is yet further realized that various functions associated with a particular avatar may be delegated from the player to the companion such that the companion may assist the player in providing responses to the game to control the avatar. This concept may be thought of as "cooperative gaming."

The term, "cooperative play," "cooperative gameplay," "cooperative gaming" or "multi-client control of an avatar" will be used synonymously to denote this concept.

"Cooperative play" is different from forming a team in a multi-player game and coordinating the team's activities. "Cooperative play" involves the cooperatively playing players viewing the same video stream and joint control of a single avatar (avatar or object) in the game being played. From the perspective of the game, the cooperatively playing players are treated and appear as a single player.

It is still further realized that cooperative gaming need not require games that have been deliberately designed to accommodate it. In other words, "legacy" games or other games designed to allow a single player to control a particular avatar may, through the use of cooperative play middleware, permit cooperative gaming to be carried out.

It is yet still further realized that an existing three-dimensional (3D) "stereoscopic" device driver may be configured to support cooperative gaming wherein a companion is visually placed beside a gamer and the companion sees a view that is different from, but related to, the view that the gamer sees. As those skilled in the pertinent art understand, a stereoscopic device driver is designed to render left-eye and right-eye views of a particular game space, wherein a separation parameter defines the distance between the left-eye and the right-eye views. Normally the separation parameter is set equal to the average distance by which human eyes are separated, i.e. a value of about a decimeter. However, it is realized herein that the separation parameter may be increased to a counterintuitive and therefore nonobvious value of three or more decimeters. This dramatically larger value is unexpected, because it frustrates a gamer's stereoscopic perspective and therefore renders views that make the stereoscopic device driver unfit for its normal use. However, it is realized herein that the far greater rendered view separation resulting from the increased separation parameter is useful for a purpose for which the stereoscopic device driver was never designed: namely to enable two separate individuals to play "side-by-side" in the game space. Thus, two separate players may sit side-by-side in vehicle avatar such as an automobile, truck, airplane or helicopter and cooperate with one another to control the vehicle avatar (e.g., by cooperatively driving or piloting and navigating or firing). Two separate players may sit side-by-side and control a weapon avatar, such as a sniper rifle or anti-aircraft gun (e.g., by cooperatively firing and aiming or loading). The possibilities for cooperative control of an avatar are virtually endless.

In certain embodiments, at least one of the rendered views is delivered as a video stream over a computer network such as the Internet. A "video stream" is a series of frames of rendered video images, which may or may not include audio, deigned to be delivered at a rate that causes a viewer to interpret them as conveying motion (i.e. at least 12 frames per second, and typically 18 frames per second or greater). "Cooperative play middleware" is software or firmware that mediates communication between a game and one or more cooperatively playing clients. The cooperative play middleware may execute on a server in the cloud or a particular client, resulting in a "cooperative play engine." A "game" is software or firmware that presents recreational or educational challenges that players wish to engage and surmount. The game may execute on a server in the cloud, resulting in a "game engine." A "response stream" is a sequence of responses a player provides to a game via his corresponding client, and the player may provide the responses by means of one or more input devices, e.g., button, mouse, switch, joystick, yoke or pedal. The sequence of responses may cause the player's avatar to act in a certain way, e.g., to run in a particular direction, turn a particular way, fly or land, pick up or drop an object, change modes of operation, fire or change weapons or pause, resume, restart or end the game. Responses and input devices vary about as widely as the games themselves.

It is yet further realized that the cooperative play middleware or engine may create a joint response stream from separate response streams created by the cooperatively playing players in various ways. It is still further realized herein that the game may be a multi-player game, and that fewer than all of its players may be playing cooperatively. Those who are not playing cooperatively are said herein to be playing individually, which is the conventional way multi-player games are played.

Accordingly, introduced herein are various embodiments of a system and method for multi-client control of an avatar using different, but related, views. The rendered views are different because they are separated from each other by a distance defined by a separation parameter. However, the rendered view are also related to one another, because the separation parameter remains constant over an extended period of time, e.g., while two players are sitting in a vehicle. In one embodiment, the distance is a horizontal distance. In one embodiment, the separation parameter may be predetermined and nonadjustable for a given game or avatar. In alternative embodiments, a player may change the separation parameter.

FIG. 1 is a diagram of one embodiment of a cloud 100 of computing resources, including processing and storage resources therein. As those skilled in the pertinent art understand, a "cloud" is an abstract term for a collection of networked processing and storage resources. The Internet represents perhaps the most significant example of a cloud. However, intranets, extranets or other physical or virtual networks may serve as clouds.

The cloud 100 embodiment of FIG. 1 is illustrated as including two servers: server A 110 and server B 120. Server A 110 takes the form of a computer and includes a processor 111, memory 112 and a network adapter 113. The processor 111 includes one or more central processing units (CPUs) (not shown) and often one or more co-processors, which may take the form of one or more graphics processing units (not shown). The memory 112 usually contains a mix of read-only memory (ROM) or other nonvolatile solid-state memory, volatile random-access memory (RAM) and one or more solid-state or hard drive storage units. Likewise, server B 120 takes the form of a computer and includes a processor 121, memory 122 and a network adapter 123.

Figure 2:
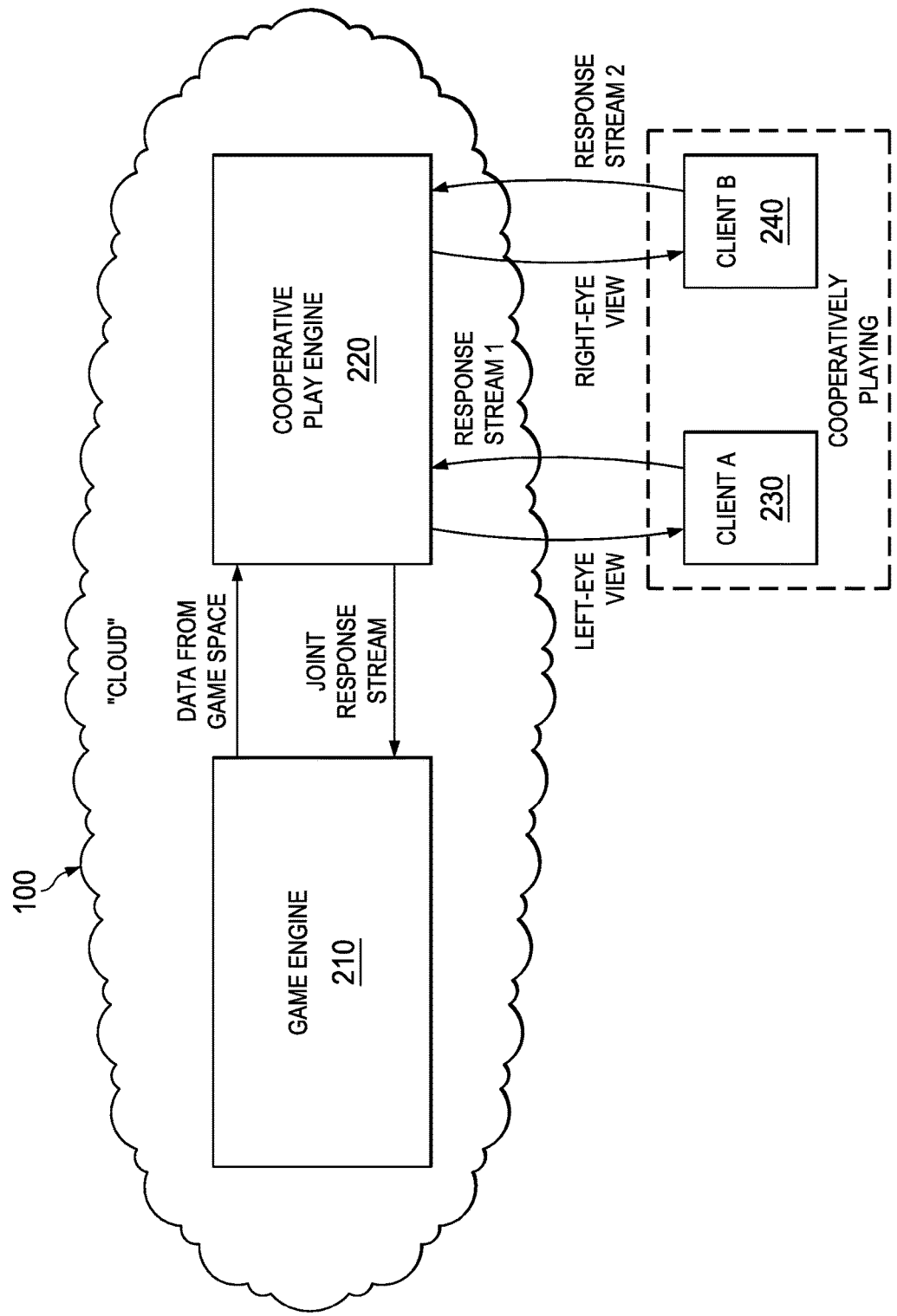
FIG. 2 is a diagram of one embodiment of the cloud of FIG. 1 having a game engine and a cooperative play engine and capable of supporting multi-client control of an avatar using different, but related, views.

FIG. 2 is a diagram of one embodiment of the cloud of FIG. 1 having a game engine and a cooperative play engine and capable of supporting multi-client control of an avatar using different, but related, views. The cloud 100 is illustrated as including a game engine 210 and a cooperative play engine 220. In one embodiment, the game engine 210 is embodied in the server A 110 of FIG. 1, and the cooperative play engine 220 is embodied in the server B 120 of FIG. 1. In another embodiment, the game engine 210 and the cooperative play engine 220 are embodied in a single server. In yet another embodiment, one or both of the game engine 210 and the cooperative play engine 220 are embodied in multiple servers.

In the embodiment of FIG. 2, the game engine executes game code (not shown) that instantiates, or brings into existence, a game. The game is configured to create a game in a game space for at least one player (e.g., player A). Player A is provided a view of the game space, allowing Player A to play the game. The game is also configured to receive a response stream from player A containing responses (commands or actions) that player A makes as player A plays the game.

However, as is introduced herein, player A wishes to enlist the help or cooperation of another person in playing the game. Player A does not wish to play against that person, but rather wishes that the other person cooperate with player A to control an avatar in the game to some degree or extent. That person agrees to cooperate, and thus will now be called "player B." In cooperative play, players A and B have separate clients, which may be computers, mobile devices, game controllers, terminals or the like. Accordingly, with reference to FIG. 2, player A is associated with a client 230, and player B is associated with a client 240.

Arrows in FIG. 2 denote the communication of data among the game engine 210, the cooperative play engine 220, the client 230 and the client 240. As stated above, the game engine 210 creates a game space for the game and makes data from the game space available so a view of the game space may be rendered for player A. In the embodiment of FIG. 2, the cooperative play engine 220 renders two views from the data: a left-eye view and a right-eye view, using a separation parameter to define the distance separating the perspective of the left-hand view from the right-hand view. The rendered left-hand view is transmitted toward and ultimately delivered to the client 230 (associated with player A). The rendered right-hand view is transmitted toward and ultimately delivered to the client 240 (associated with player B), as FIG. 2 illustrates. The left-hand view and the right-hand view are such that the players associated with the client 230 and the client 240 have the impression that they are standing, sitting, crouching or lying next to one another in the game space.

Both player A and player B provide responses to the game based on the left-hand and right-hand views, resulting in respective response stream 1 and response stream 2. As FIG. 2 also illustrates, the response stream 1 is transmitted by the client 230, and the response stream 2 is transmitted by the client 240. The cooperative play engine 220 receives both the response stream 1 and response stream 2, and combines the response stream 1 and response stream 2 to yield a joint response stream. As FIG. 2 illustrates, the cooperative play engine 220 transmits the joint response stream to the game engine 210, which handles the joint response stream as though it were coming from a single player (namely player A).

Those skilled in the pertinent art will realize that the game engine 210 need not be modified in any way to accommodate cooperative play. The game engine 210 needs only to make certain data from its game space available to the cooperative play engine 220 and receive the joint response stream from the cooperative play engine 220. In this sense, the cooperative play engine 220 serves as a proxy for player A. It is readily apparent that the ability to enhance existing (legacy) games and game engines to accommodate cooperative play without requiring those games or game engines to be modified is a significant potential advantage in certain embodiments.

Figure 3:
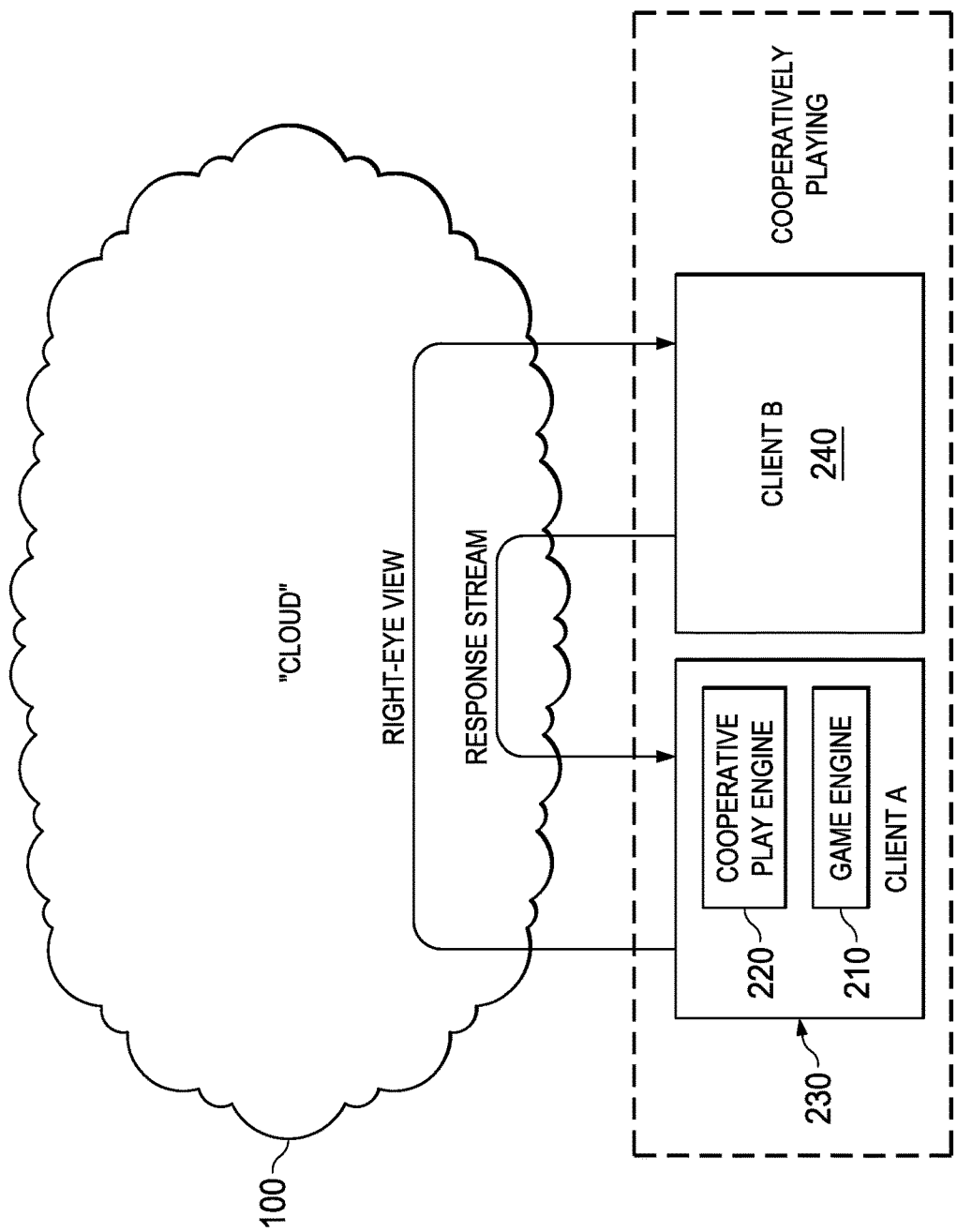
FIG. 3 is a diagram of one embodiment of the cloud of FIG. 1 or 2, together with a client having a game engine and a cooperative play engine and capable of supporting multi-client control of an avatar using different, but related, views.

FIG. 3 is a diagram of one embodiment of the cloud of FIG. 1 or 2, together with a client having a game engine and a cooperative play engine and capable of supporting multi-client control of an avatar using different, but related, views. In one embodiment, the client is a general-purpose computer. In another embodiment, the client is a game console.

In the embodiment of FIG. 3, the game engine 210 executes game code (not shown) that instantiates, or brings into existence, a game. The game is configured to generate a game space and makes data from the game space available so a view of the game space may be rendered for player A. In the embodiment of FIG. 2, the cooperative play engine 220 renders two views from the data: a left-eye view and a right-eye view, using a separation parameter to define the distance separating the perspective of the left-hand view from the right-hand view. The rendered left-hand view is transmitted toward and ultimately delivered to the client 230

(associated with player A), in that it is displayed on a display screen (not shown) associated with the client 230. The rendered right-hand view is transmitted toward and ultimately delivered to the client 240 (associated with player B), in that it is converted into a video stream and transmitted to the client 240 through the cloud 100, as FIG. 3 illustrates. As with FIG. 2, the left-hand view and the right-hand view are such that the players associated with the client 230 and the client 240 have the impression that they are standing, sitting, crouching or lying next to one another in the game space.

Both player A and player B provide responses to the game based on their views of the game space, resulting in the transmission from the client 240 to the client 230 of a response stream as FIG. 3 shows. The cooperative play engine 220 receives both a response stream from player A (not shown) and the response stream from player B, and combines them to yield a joint response stream.

In an alternative embodiment, the left-hand view is transmitted toward and ultimately delivered to the client 240, while the right-hand view remains in the client 230.

Figure 4:
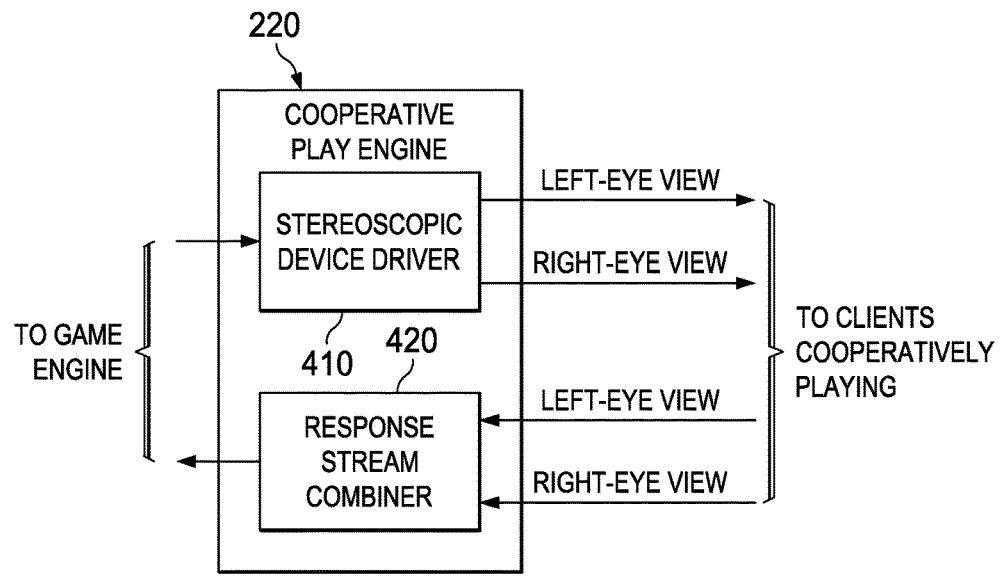
FIG. 4 is a block diagram of one embodiment of a cooperative play engine.

FIG. 4 is a block diagram of one embodiment of the cooperative play engine 220. The illustrated embodiment of the cooperative play engine 220 includes a stereoscopic device driver 410. The stereoscopic device driver 410 is configured to receive from a game engine data pertaining to a game space and create from it left-eye and right-eye views that are different but related to one another as a separation parameter defines. As described above, the separation parameter defines a distance that is substantially more than a natural human eye distance apart. In one embodiment, the separation parameter defines a distance of no less than three decimeters, which is at least about three times the average distance that separates human left and right eyes.

The stereoscopic device driver 410 is further configured to transmit the left-eye and right-eye views respectively toward different clients (e.g., the client 230 and the client 240 of FIG. 2 or 3). Those skilled in the pertinent art understand how stereoscopic device drivers are structured and function, and that conventional as well as later-developed stereoscopic device drivers fall within the broad scope of the invention.

The illustrated embodiment of the cooperative play engine 220 further includes a response stream combiner 420. The response stream combiner 420 is coupled to the stereoscopic device driver 410 (in the sense that they cooperate with one another to effect cooperative play) and is configured to combine separate response streams from the particular player and the at least one other player into a joint response stream based on avatar functions contained therein. The response stream combiner 420 is further configured to provide the joint response stream to the game engine.

"Avatar functions" are functions associated with a given avatar that effect its control. For example, if the avatar is a human character, typical avatar functions include legs, arms, head and hands. If the avatar is an airplane (an example of an object), typical avatar functions include yoke (which controls ailerons and elevators), pedals (which controls a rudder), throttles (which control the engines), flap controls and landing gear controls, to name just a few. As stated above, it may be desirable for a player to delegate one or more of his avatar functions to one or more other players, while retaining one or more of the avatar functions for himself. It may further be desirable for the player to change the delegation of functions, perhaps depending upon the environment in which the avatar is operating at the time (e.g., level of play or situation).

In one embodiment, the particular player selects at least one of the avatar functions to retain. In another embodiment, the particular player selects at least one of the avatar functions to delegate to the at least one other player. In either embodiment, avatar functions may be grouped based upon the type of input device that typically controls the avatar functions. For example, leg and arm movement may typically be controlled by a joystick. Thus, it would normally be the case that leg and arm movement is delegated to the same player. If the avatar is carrying a weapon of some sort, it would normally be the case that all weapon-related functions (e.g., selecting, loading and firing and target identifying) is delegated to the same player. If the avatar is an airplane, the same player would likely control both yoke functions, namely aileron and elevator control, while another player might control the throttle and flap control, navigate and/or communicate. In another embodiment, the game being played allows avatar functions to be reassigned to other input devices or portions (e.g., buttons) on input devices. In such case, avatar functions may be ungrouped or regrouped as needed, then delegated as desired by the player.

Those skilled in the pertinent art will understand that many other embodiments exist for combining separate response streams into a joint response stream based on avatar functions contained therein. These embodiments need not be static, either. They may change over time or differ according to a given avatar function.

Certain embodiments of the cooperative play engine 220 accommodate control functions that do not necessarily involve interaction with the cloud gaming engine 210. For example, a player (not shown) may interact with the cooperative play engine 220 to initiate a session of cooperative play, invite other players to join him in cooperative play, determine the players to whom particular avatar functions are delegated, disengage disruptive players from cooperative play, establish and conduct communication between or among cooperative players by text messaging or intercom or select a game to play. These are but a few examples.

Figure 5:
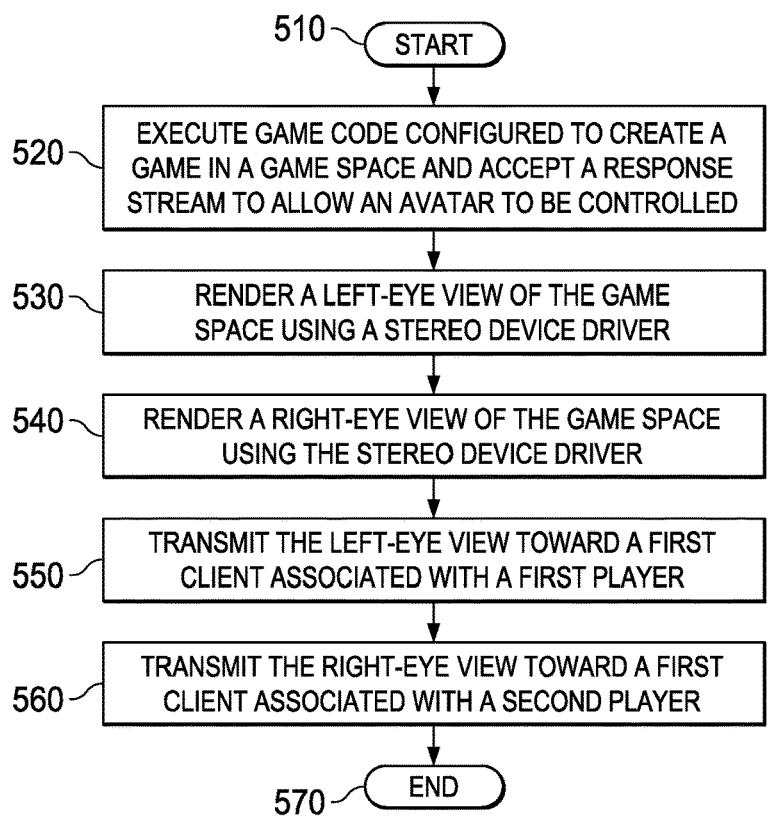
FIG. 5 is a flow diagram of one embodiment of a method of controlling an avatar cooperatively.

FIG. 5 is a flow diagram of one embodiment of a method of controlling an avatar cooperatively. The method begins in a start step 510. In a step 520, game code is executed. The game code is configured to create a game in a game space and accept a response stream to allow an avatar to be controlled. In a step 530, a left-eye view of the game space is rendered using a stereoscopic device driver. In a step 540, a right-eye view of the game space is rendered using the stereoscopic device driver. In a step 550, the left-eye view is transmitted toward a first client associated with a first player. In a step 560, the right-eye view is transmitted toward a second client associated with a second player. The method ends in an end step 570.

Those skilled in the art to which this application relates will appreciate that other and further additions, deletions, substitutions and modifications may be made to the described embodiments.

What is claimed is:

1. A system for multi-client control of an avatar, comprising:
   a game engine configured to execute game code configured to create a game in a game space and accept a response stream to allow an avatar in said game to be controlled by first and second players; and
   a cooperative play engine associated with said game engine for communication therewith and having a stereoscopic device driver configured to render left-eye and right-eye views of said avatar, said cooperative play engine configured to:

transmit said left-eye view toward a first client associated with said first player, and transmit said right-eye view toward a second client associated with said second player; and wherein said game engine and said cooperative play engine are executed by a processor.

2. The system as recited in claim 1 wherein a separation parameter, which defines a distance between said left-eye and right-eye views, is greater than three decimeters.

3. The system as recited in claim 1 wherein said cooperative play engine is further configured to receive separate response streams from said first client and said second client, combine said separate response streams into a combined response stream and provide said combined response stream to said game engine as said response stream.

4. The system as recited in claim 3 wherein said response stream from said first client controls a first subset of avatar functions and said second client controls a second subset of avatar functions.

5. The system as recited in claim 4 wherein said first and second subsets are mutually exclusive.

6. The system as recited in claim 1 wherein said avatar is selected from the group consisting of:
a character, and
an object.

7. The system as recited in claim 1 wherein said game is a multi-player game.

8. A method of controlling an avatar cooperatively, comprising:

executing game code configured to create a game in a game space and accept a response stream to allow an avatar in said game to be controlled by first and second players;

rendering a left-eye view of said avatar using a stereoscopic device driver, which is executed by a processor;

rendering a right-eye view of said avatar using said stereoscopic device driver;

transmitting said left-eye view toward a first client associated with said first player; and transmitting said right-eye view toward a second client associated with said second player.

9. The method as recited in claim 8 wherein a separation parameter, which defines a distance between said left-eye and right-eye, is greater than three decimeters.

10. The method as recited in claim 8 further comprises:
receiving separate response streams from said first client and said second client;
combining said separate response streams into a combined response stream; and
provide said combined response stream to a game engine as said response stream.

11. The method as recited in claim 10 wherein said response stream from said first client controls a first subset of avatar functions and said second client controls a second subset of avatar functions.

12. The method as recited in claim 11 wherein said first and second subsets are mutually exclusive.

13. The method as recited in claim 8 wherein said avatar is selected from the group consisting of:
a character, and
an object.

14. The method as recited in claim 8 wherein said game is a multi-player game.

15. A cooperative play engine, comprising:
a game engine configured to execute game code configured to create a game in a game space based in part on a response stream allowing an avatar in said game to be controlled by first and second players; and
a cooperative play engine associated with said game engine for communication therewith and having a stereoscopic device driver configured to render left-eye and right-eye views of said avatar, said cooperative play engine configured to:
transmit said left-eye view toward a first client associated with said first player,
transmit said right-eye view toward a second client associated with said second player,
receive separate response streams from said first client and said second client,
combine said separate response streams into a combined response stream, and
provide said combined response stream to said game engine; and
wherein said game engine and said cooperative play engine are executed by a processor.

16. The cooperative play engine as recited in claim 15 wherein a separation parameter, which defines a distance between said left-eye and right-eye views, is greater than three decimeters.

17. The cooperative play engine as recited in claim 15 wherein said response stream from said first client controls a first subset of avatar functions and said second client controls a second subset of avatar functions.

18. The cooperative play engine as recited in claim 17 wherein said first and second subsets are mutually exclusive.

19. The cooperative play engine as recited in claim 15 wherein said avatar is selected from the group consisting of:
a character, and
an object.

20. The cooperative play engine as recited in claim 15 wherein said game is a multi-player game.

* * * * *